(12) United States Patent  
Tashiro (10) Patent No.: US 8,827,031 B2  
(45) Date of Patent: Sep. 9, 2014

(54) MOTOR VEHICLE STEERING SYSTEM

(75) Inventor: Takashi Tashiro, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 302 days.

(21) Appl. No.: 13/274,774

(22) Filed: Oct. 17, 2011

(65) Prior Publication Data

US 2012/0097473 A1 Apr. 26, 2012

(30) Foreign Application Priority Data

Oct. 21, 2010 (JP) ................ 2010-236866  
Sep. 14, 2011 (JP) ................ 2011-200739

(51) Int. Cl.  
B62D 5/04 (2006.01)

(52) U.S. Cl.  
CPC ............ B62D 5/0448 (2013.01); B62D 5/0427 (2013.01)  
USPC ...................................................... 180/444

(58) Field of Classification Search  
USPC .......... 180/402, 444, 412, 414, 415, 422, 429  
See application file for complete search history.

(56) References Cited

U.S. PATENT DOCUMENTS

| | | | | |
|---|---|---|---|---|
| 4,834,202 A * | 5/1989 | Shimizu | ............... | 180/444 |
| 5,216,928 A * | 6/1993 | Kodachi | ............... | 74/422 |
| 5,709,283 A * | 1/1998 | Nief | ............... | 180/428 |
| 6,848,534 B2 * | 2/2005 | Toyofuku et al. | ............. | 180/444 |
| 6,973,990 B2 * | 12/2005 | Honaga et al. | ................ | 180/444 |
| 7,401,677 B2 * | 7/2008 | Boyle et al. | ................... | 180/444 |
| 2008/0129133 A1 | 6/2008 | Taube et al. | | |

FOREIGN PATENT DOCUMENTS

| | | |
|---|---|---|
| DE | 101 42 599 A1 | 4/2003 |
| DE | 10 2008 002 176 A1 | 12/2009 |
| FR | 2 605 280 A1 | 4/1988 |
| GB | 2 198 098 A | 6/1988 |
| JP | B2-356944 | 8/1991 |
| JP | A-2000-233759 | 8/2000 |
| JP | A-2006-76541 | 3/2006 |
| JP | A-2007-531489 | 11/2007 |
| JP | B2-4259854 | 2/2009 |
| JP | A-2010-105031 | 5/2010 |
| JP | A-2010-132060 | 6/2010 |
| WO | WO 81/03472 | 12/1981 |

OTHER PUBLICATIONS

Jan. 9, 2012 European Search Report issued in European Patent Application No. 11 18 5831.2.

* cited by examiner

Primary Examiner — Tony Winner  
(74) Attorney, Agent, or Firm — Oliff PLC (57) ABSTRACT

A motor vehicle steering system includes a steered shaft inserted through a tubular housing and a screw shaft provided on the intermediate portion of the steered shaft. A ball nut threadably engaged on the screw shaft via balls is driven to rotate by electric motors. A first bushing and a second bushing held by the housing support the first end portion and the second end portion of the steered shaft slidably in the axial direction, respectively. The central axis of the intermediate portion of the steered shaft is offset from the central axis of the first end portion and the central axis of the second end portion of the steered shaft. The central axis of the ball nut and the central axis of the intermediate portion of the steered shaft match each other.

7 Claims, 9 Drawing Sheets

MOTOR VEHICLE STEERING SYSTEM

BACKGROUND OF THE INVENTION

1. Field of the Invention

The present invention relates to a motor vehicle steering system.

2. Description of Related Arts

In the rack-and-pinion electric power steering system disclosed in Patent Document 1 listed below, a bushing that supports an end portion of a rack shaft movably has an odd sectional shape at the inner periphery so as not to constrain the rack shaft in a direction perpendicular to the axis of the rack shaft and perpendicular to the rack pitch surface of the rack teeth. In detail, the bushing is formed into a slot whose diameter in the direction perpendicular to the rack pitch surface is larger than the diameter in the direction parallel to the rack pitch surface.

In Patent Document 1, under low load, the bushing does not constrain the rack shaft in the direction perpendicular to the rack pitch surface, and therefore, the rack shaft is supported at two points of the portion meshing with the pinion and the portion of a ball screw mechanism. Under high load such as stationary steering, the bushing constrains the rack shaft in the direction parallel to the rack pitch surface, and therefore, the rack shaft is supported at three points of the portion meshing with the pinion, the portion of the ball screw mechanism, and the bushing.

When the rack shaft is formed of a metal tube material, in order to realize an uneven thickness so that the flat portion of the rack tooth forming D-shaped section becomes thick in thickness, a method for manufacturing an uneven thickness metal tube by using eccentric drawing was proposed (for example, refer to Patent Documents 2 and 3 listed below).

In addition, a steering control device that transmits a radial load and a thrust load that are transmitted from the tire to the rack via a steering knuckle via an elastic body was proposed (for example, refer to Patent Document 4 listed below).

Further, a rack-pinion steering system in which the axis center of the support surface on one end of the rack shaft is made eccentric from the axis center of the support surface on the other end to prevent the rack shaft from twisting was proposed (for example, refer to Patent Document 5 listed below).

Further, an electric power steering system in which a guide bushing supporting the outer periphery of the rack shaft is supported on the inner periphery of a ball nut via a rolling bearing was proposed (for example, refer to Patent Document 6 listed below).

Further, an electric power steering system in which an end bushing supporting the rack shaft movably in a direction of the axis of the rack shaft is arranged so as not to constrain the rack shaft in a direction perpendicular to the axis and perpendicular to the pitch surface of the rack teeth was proposed (for example, refer to Patent Document 7 listed below).

Further, an electric actuator using a steer-by-wire ball screw was proposed (for example, refer to Patent Document 8 listed below).

Patent Document 1: Japanese Published Unexamined Patent Application No. 2006-76541 (8th to 9th paragraphs, 28th to 29th paragraphs, and 32nd to 33rd paragraphs)

Patent Document 2: Japanese Published Unexamined Patent Application No. 2010-105031 (Abstract)

Patent Document 3: Japanese Patent Publication No. 4259854

Patent Document 4: Japanese Published Examined Patent Application No. H03-56944 (FIGS. 6(a) to 6(c), line 9 of 28th column of page 14 to line 42 of 32nd column of page 16)

Patent Document 5: Japanese Published Unexamined Patent Application No. 2000-233759

Patent Document 6: Japanese Published Unexamined Patent Application No. 2010-132060

Patent Document 7: Japanese Published Unexamined Patent Application No. 2006-76541

Patent Document 8: Japanese Translation of International Application (Kohyo) No. 2007-531489

In Patent Document 1, the rack shaft is prevented from rotating by a meshing pressure between the rack teeth and the pinion teeth. The bushing of Patent Document 1 is formed into a slot, so that it increases the manufacturing cost and does not have a function to restrict the rack shaft from rotating.

On the other hand, generally, in a rack-pinion motor vehicle steering system, a section on the end portion of the rack shaft is formed to have a D shape, and the section on the inner periphery of the bushing is also formed to have a D shape, and accordingly, the rack shaft is reliably restricted from rotating. However, this increases the manufacturing cost.

In recent years, a so-called steer-by-wire motor vehicle steering system in which the mechanical joining between the steering wheel and the steered wheels is cut off is proposed. In this type of motor vehicle steering system, it is necessary to restrict the steered shaft from rotating by using the above-described bushing, etc.

On the other hand, many industrial vehicles and welfare vehicles are of a type that turns the rear wheel, and in such a vehicle, in order to secure a necessary steering angle, the rear wheels as steered wheels must be turned at a great steered angle. Therefore, the steered shaft tends to be subjected to a high radial load due to a road surface reaction force. For example, in a steer-by-wire vehicle, a ball screw mechanism provided on the steered shaft and the actuator that drives the ball screw mechanism are subjected to a high radial load and their durability is deteriorated.

An object of the present invention is to provide a motor vehicle steering system that can restrict a steered shaft from rotating inexpensively. Another object of the present invention is to provide a motor vehicle steering system capable of reducing the influence of a radial load to be applied to the steered shaft and excellent in durability.

SUMMARY OF THE INVENTION

An aspect of the present invention provides a motor vehicle steering system including a tubular housing, a steered shaft that has a first end portion and a second end portion and an intermediate portion between the first end portion and the second end portion, and is inserted through the housing, a screw shaft provided on the intermediate portion of the steered shaft, a ball nut threadably mounted on the screw shaft via a ball, an electric motor that drives and rotates the ball nut, and a first bushing and a second bushing that are held by the housing and support the first end portion and the second end portion of the steered shaft slidably in an axial direction of the steered shaft. The central axis of the intermediate portion of the steered shaft is offset from the central axis of the first end portion and the central axis of the second end portion of the steered shaft. The central axis of the ball nut and the central axis of the intermediate portion of the steered shaft match each other.

According to the aspect of the present invention, the central axes of the end portions of the steered shaft supported by the bushings are offset from the central axis of the intermediate portion. Therefore, even without forming the end portions of the steered shaft and the bushings to have odd-shaped sections, for example, D-shaped sections, etc., the steered shaft can be restricted from rotating by bushings having simple shapes, for example, circular bushings. Therefore, the steered shaft can be reliably restricted from rotating inexpensively. The present invention that restricts the steered shaft from rotating is also applicable to a rack-pinion motor vehicle steering system and a steer-by-wire motor vehicle steering system.

BRIEF DESCRIPTION OF THE DRAWINGS

FIG. 2(a) shows a straight advancing state of a motor vehicle, FIG. 2(b) shows a state where the steered angle of the steered wheels is a predetermined value, and FIG. 2(c) shows a state where the steered angle of the steered wheels is over a predetermined value.

DETAILED DESCRIPTION OF THE PREFERRED EMBODIMENT

Preferred embodiments of the present invention will be described with reference to the accompanying drawings.

Figure 1:
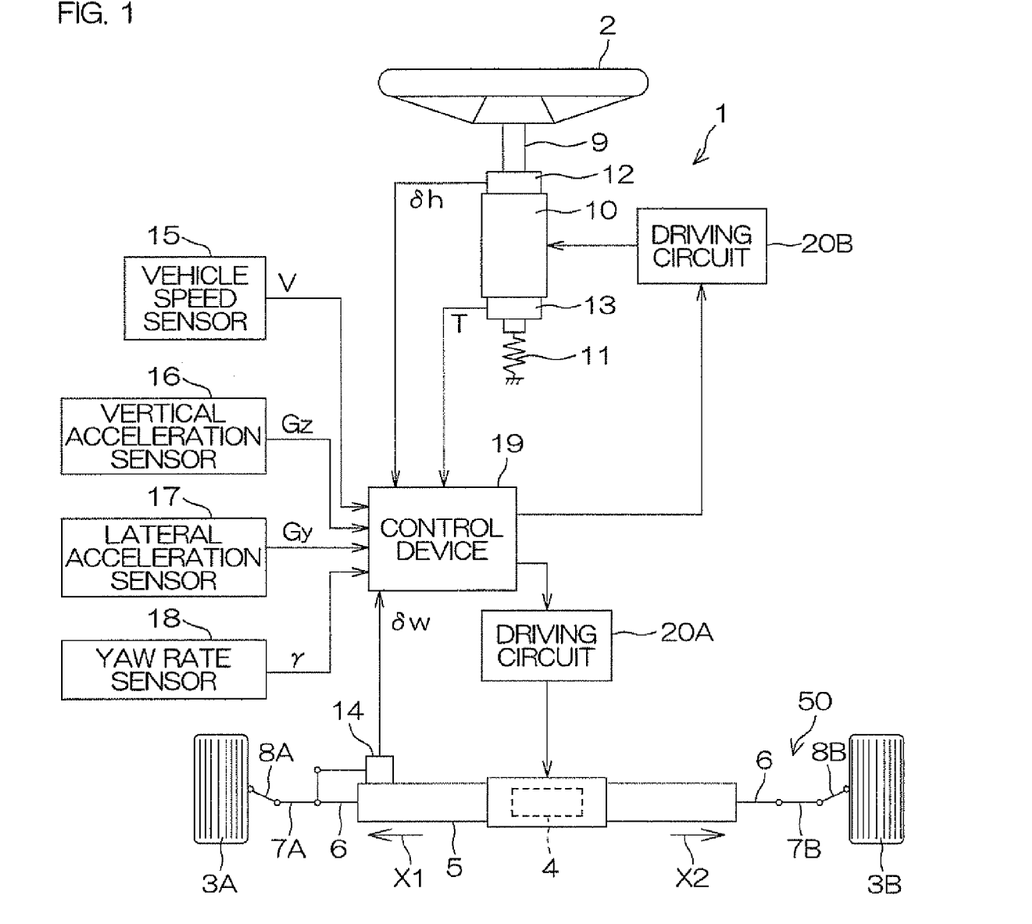
FIG. 1 is a schematic view showing a general configuration of a motor vehicle steering system according to a preferred embodiment of the present invention.

FIG. 1 is a schematic view showing a general configuration of a motor vehicle steering system according to a preferred embodiment of the present invention. Referring to FIG. 1, this motor vehicle steering system 1 composes a so-called steer-by-wire system in which the mechanical coupling between the steering member 2 such as a steering wheel and the steered wheels 3 is cut off.

An operation of a turning actuator 4 that is driven according to a rotating operation of the steering member 2 and includes, for example, a brushless electric motor converted into linear motion in the vehicle width direction of the steered shaft 6 supported by the housing 5, and this linear motion of the steered shaft 6 is converted into a turning motion of the left and right steered wheels 3 for steering, and accordingly, turning is achieved.

A driving force (a rotating force of an output shaft) of the turning actuator 4 is converted into a linear motion in the first axial direction X1 (leftward direction) or the second axial direction (rightward direction) of the steered shaft 6 by a motion converting mechanism (for example, a ball screw mechanism) provided in association with the steered shaft 6. This linear motion of the steered shaft 6 is transmitted to the tie rods 7A and 7B provided to project from the end portions of the steered shaft 6, and causes corresponding knuckle arms 8A and 8B to turn. Accordingly, the steered wheels 3A and 3B supported by the knuckle arms 8A and 8S are turned.

The steered shaft 6, the tie rods 7A and 7B, and the knuckle arms 8A and 8B, etc., constitute a turning mechanism 50 for turning the steered wheels 3A and 3B. The housing 5 that supports the steered shaft 6 is fixed to the vehicle body via a bracket, etc., not shown.

Figure 2:
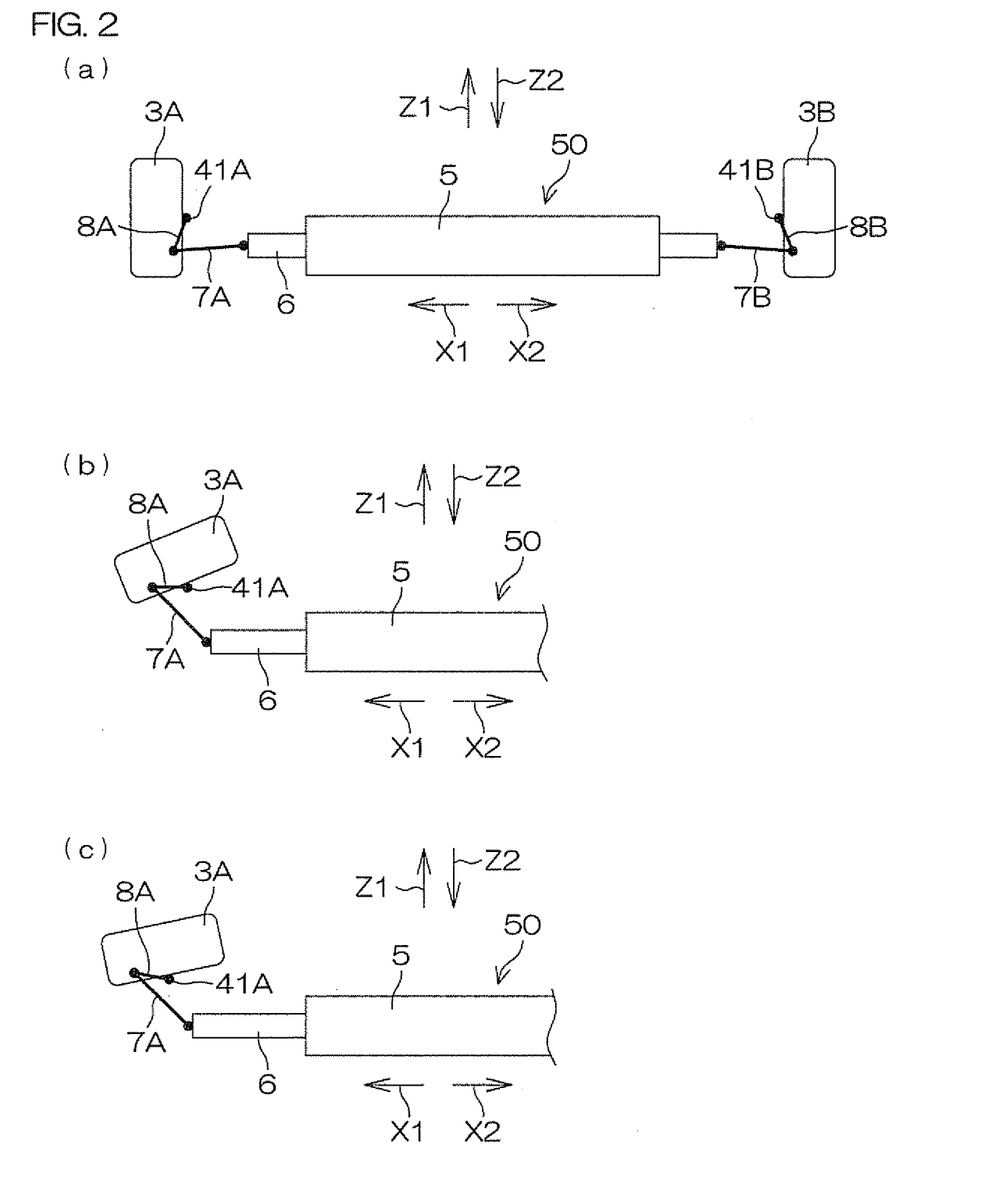
FIG. 2 are general plan views of a turning mechanism.

FIGS. 2(a), 2(b), and 2(c) are general plan views of the turning mechanism 50. When the steered wheels 3A and 3B are turned, the knuckle arms 8A and 8B change their directions. Specifically, when the motor vehicle is advancing straight and the steered wheels 3A and 3B are directed to the forward direction Z1 as shown in FIG. 2(a), the knuckle arms 8A and 8B extend in the rearward direction Z2 of the motor vehicle from corresponding king pins 41A and 41B.

As shown in FIG. 2(b), when the steered shaft 6 moves in the first axial direction X1 (leftward direction) and the steered angle of the steered wheel 3A reaches a predetermined value, the knuckle arm 8A becomes parallel to the steered shaft 6.

When the steered shaft 6 further moves in the first axial direction X1 (leftward direction) from the state shown in FIG. 2(b) into the state shown in FIG. 2(c) and the steered angle of the steered wheel 3A exceeds the predetermined value, the knuckle arm 8A extends toward the front side of the motor vehicle from the king pin 41A.

When the steered shaft 6 moves in the second axial direction X2 (rightward direction) and the steered angle of the steered wheel 35 reaches the predetermined value, the knuckle arm 85 becomes parallel to the steered shaft 6 although this is not shown. When the steered shaft 6 further moves in the second axial direction X2 (rightward direction) and the steered angle of the steered wheel 35 exceeds the predetermined value, the knuckle arm 8B extends in the forward direction Z1 of the motor vehicle from the king pin 415 although this is not shown.

The steering member 2 is joined to a rotary shaft 9 supported rotatably with respect to the vehicle body. To this rotary shaft 9, a reaction force actuator 10 for applying an operation reaction force to the steering member 2 is attached. The reaction force actuator 10 includes an electric motor such as a brushless motor including an output shaft integrated with the rotary shaft 9.

To an end portion on the opposite side of the steering member 2 of the rotary shaft 9, an elastic member 11 including, for example, a coil spring, is coupled between the vehicle body. This elastic member 11 returns the steering member 2 to a straight advancing steering position when the reaction force actuator 10 applies no torque to the steering member 2.

In order to detect an operation input value of the steering member 2, a steering angle sensor 12 for detecting a steering angle $\delta_h$ of the steering member 2 is provided in association with the rotary shaft 9. The rotary shaft 9 is provided with a torque sensor 13 for detecting a steering torque T applied to the steering member 2. On the other hand, a steered angle sensor 14 for detecting a steered angle $\delta_w$ (tire angle) of the steered wheels 3 is provided in association with the steered shaft 6.

In addition to these sensors, a vehicle speed sensor 15 that detects a vehicle speed V, a vertical acceleration sensor 16 as a bad road condition detection sensor that detects a vertical acceleration $G_z$ of the vehicle body 60, a lateral acceleration sensor 17 that detects a lateral acceleration $G_y$ of the motor vehicle, and a yaw rate sensor 18 that detects a yaw rate $\gamma$ of the motor vehicle are provided.

Detection signals of the sensors 12 to 18 are input into a control device 19 as a motor vehicle control means including an electronic control unit (ECU) including a microcomputer.

The control device 19 sets a target steered angle based on a steering angle $\delta_h$ detected by the steering angle sensor 12 and a vehicle speed V detected by the vehicle speed sensor 15, and controls driving (controls turning) of the turning actuator 4 via a driving circuit 20A based on a difference between the target steered angle and the steered angle $\delta_w$ detected by the steered angle sensor 14.

On the other hand, the control device 19 controls driving (controls the reaction force) of the reaction force actuator 10 via a driving circuit 20B based on detection signals output from the sensors 12 to 18 so that a proper reaction force in a direction opposite to the steering direction of the steering member 2 is generated.

Figure 3:
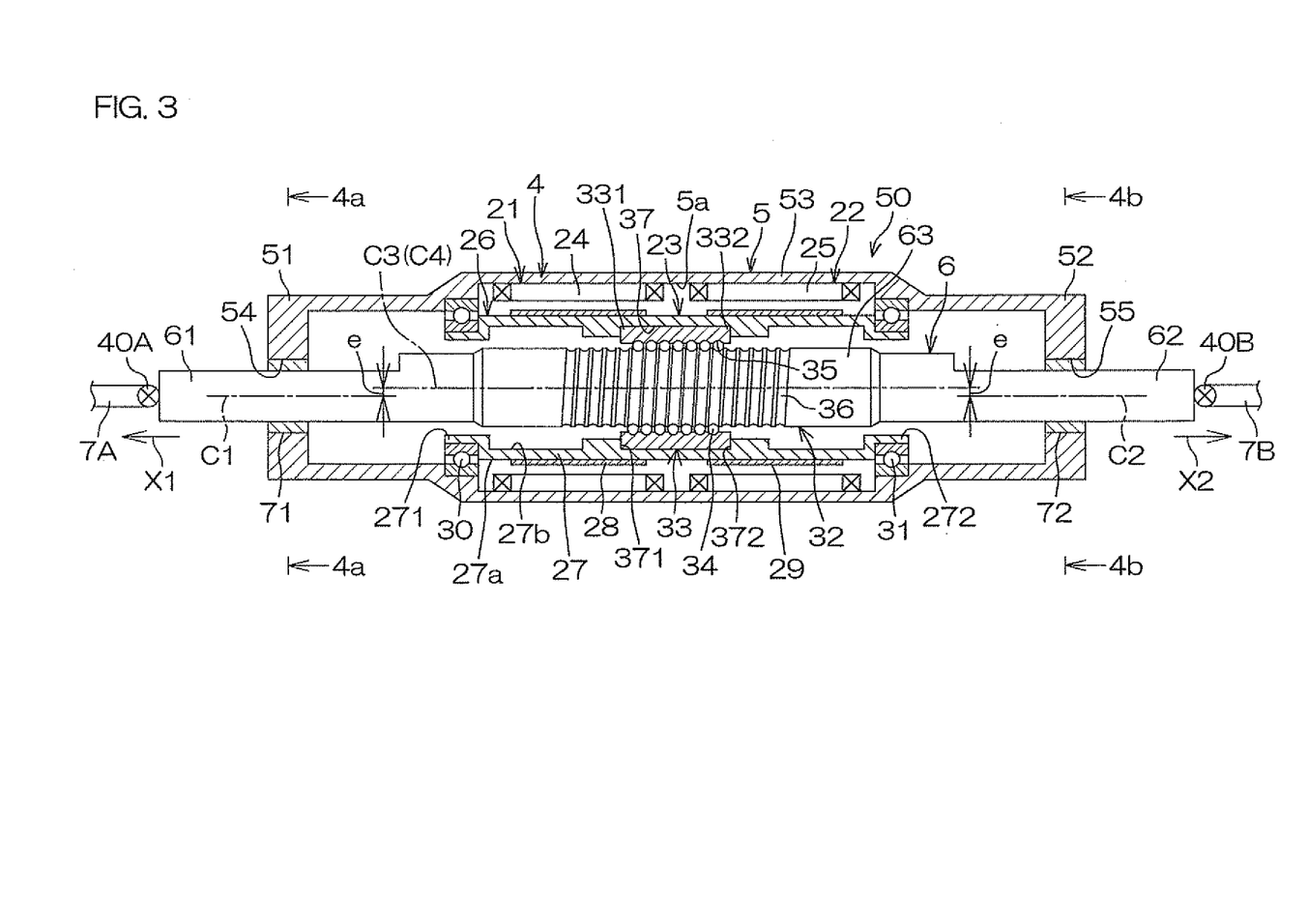
FIG. 3 is a general sectional view of the steered shaft and a mechanism that drives the steered shaft.

Referring to FIG. 3, the middle portion of the steered shaft 6 is inserted in the tubular housing 5. The housing 5 includes a first end portion 51, a second end portion 52, and an intermediate portion 53 disposed between the first end portion 51 and the second end portion 52.

First and second electric motors 21 and 22 as turning actuators and a ball screw mechanism 23 as a motion converting mechanism that converts output rotation of the electric motors 21 and 22 into an axial movement of the steered shaft 6 are disposed between the inner peripheral surface 5a of the intermediate portion 53 of the housing 5 and the steered shaft 6 inserted in the housing 5.

The steered shaft 6 includes a first end portion 61, a second end portion 62, and an intermediate portion 63 disposed between the first end portion 61 and the second end portion 62. The first end portion 61 of the steered shaft 6 is supported slidably in the first axial direction X1 and the second axial direction X2 by a first bushing 71 held in a bearing holding hole 54 of the first end portion 51 of the housing 5. The second end portion 62 of the steered shaft 6 is supported movably in the first axial direction X1 and the second axial direction X2 by a second bushing 72 held in a bearing holding hole 55 of the second end portion 52 of the housing 5. The first end portion 61 and the second end portion 62 of the steered shaft 6 are connected to corresponding tie rods 7A and 7B via corresponding ball joints 40A and 40B, respectively.

The central axis C1 of the first end portion 61 and the central axis C2 of the second end portion 62 of the steered shaft 6 are offset by a predetermined offset e from the central axis C3 of the intermediate portion 63 of the steered shaft 6. The direction of offset of the central axis C1 from the central axis C3 and the direction of offset of the central axis C2 from the central axis C3 may be the same as shown in FIG. 3, or may be different from each other, for example, opposite to each other (not shown).

Figure 4:
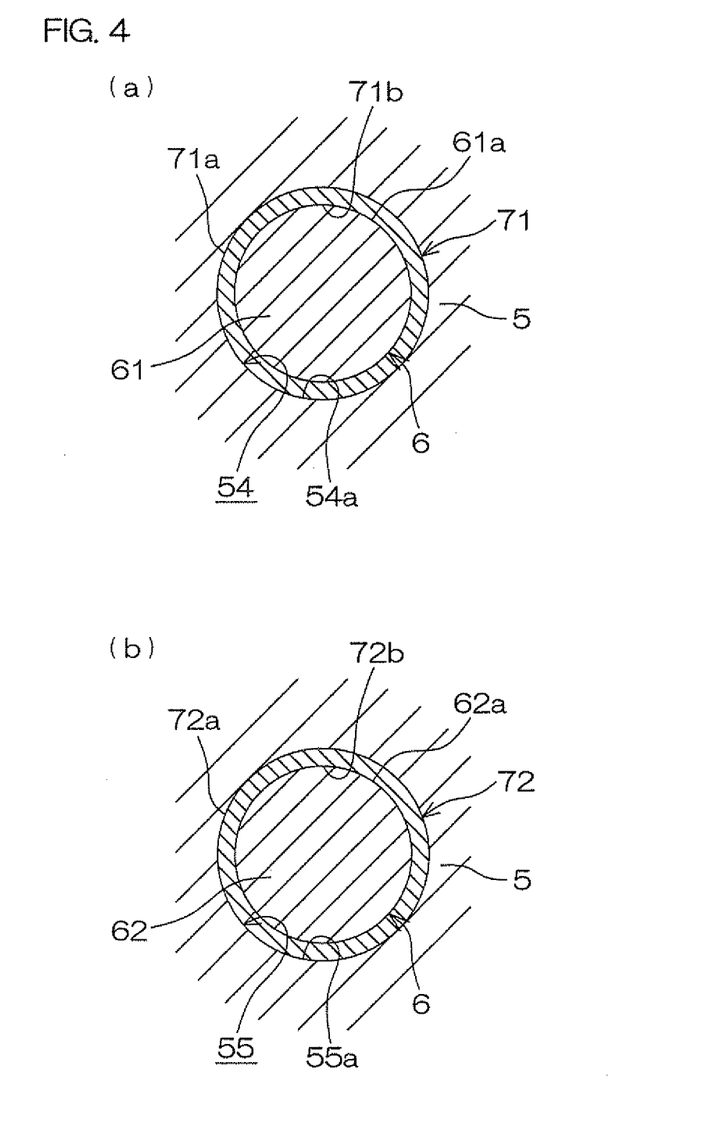
FIG. 4(a) is a sectional view taken along line 4a-4a in FIG. 3.
FIG. 4(b) is a sectional view taken along line 4b-4b in FIG. 3.

As shown in FIG. 4, the outer peripheries 71a and 72a of the bushings 71 and 72 have circular sections and match the inner peripheries 54a and 55a of the corresponding bearing holding holes 54 and 55 of the housing 5. The inner peripheries 71b and 72b of the bushings 71 and 72 have circular sections, and match the outer peripheries 61a and 62a of the corresponding end portions 61 and 62 of the steered shaft 6.

The first electric motor 21 and the second electric motor 22 constituting the turning actuator 4 is disposed side by side in the axial direction X1, X2 inside the housing 5. The first electric motor 21 includes a first stator 24 fixed to the inner peripheral surface 5a of the housing 5, and the second electric motor 22 includes a second stator 25 fixed to the inner peripheral surface 5a of the housing 5. The first electric motor 21 and the second electric motor 22 share a tubular rotor 26 surrounding the circumference of the steered shaft 6.

The rotor 26 includes a tubular rotor core 27 surrounding the circumference of the steered shaft 6, and first and second permanent magnets 28 and 29 fitted rotatably integrally to the outer peripheral surface 27a of the rotor core 27. The first permanent magnet 28 and the second permanent magnet 29 are disposed side by side in the axial direction X1, X2. The first permanent magnet 28 faces the first stator 24, and the second permanent magnet 29 faces the second stator 25.

The housing 5 supports both end portions in the axial direction of the rotor 26 rotatably via the first and second bearings 30 and 31. In detail, the rotor core 27 includes first and second end portions 271 and 272 in the axial direction. The housing 5 supports the first end portion 271 of the rotor core 27 rotatably via the first bearing 30. The housing 5 supports the second end portion 272 of the rotor core 27 rotatably via the second bearing 31. The outer races of the first bearing 30 and the second bearing 31 are restricted from moving in the axial direction with respect to the housing 5, and the inner races of the first bearing 30 and the second bearing 31 are restricted from moving in the axial direction with respect to the rotor core 27. Accordingly, the rotor core 27 is restricted from moving in the axial direction with respect to the housing 5.

The ball screw mechanism 23 includes a screw shaft 32 formed on a part of the steered shaft 6, a ball nut 33 that surrounds the circumference of the screw shaft 32 and rotates integrally with the rotor core 27, and a large number of balls 34 arranged in a row. The balls 34 are interposed between a spiral screw groove (female screw groove) formed on the inner periphery of the ball nut 33 and a spiral screw groove 36 (male screw groove) formed on the outer periphery of the screw shaft 32. The ball nut 33 is engaged on the screw shaft 32 via the balls 34.

The ball nut 33 is fitted to the inner peripheral surface 27b of the rotor core 27 rotatably integrally. The ball nut 33 and the rotor core 27 are restricted from moving in the axial direction relative to each other. In detail, the ball nut 33 is fitted to a recess 37 (the bottom of the recess 37) formed on the inner peripheral surface 27b of the rotor core 27 rotatably integrally. The central axis C4 of the ball nut 33 matches the central axis C3 of the intermediate portion 63 of the steered shaft 6.

The first and second end portions 331 and 332 in the axial direction of the ball nut 33 are in contact with the corresponding inner wall surfaces 371 and 372 of the recess 37. Accordingly, the ball nut 33 is restricted from moving in the axial direction with respect to the rotor core 27. On the other hand, as described above, the rotor core 27 is restricted from moving in the axial direction with respect to the housing via the first and second bearings 30 and 31. Therefore, the ball nut 33 is restricted from moving in the axial direction with respect to the housing 5.

According to the present preferred embodiment, a screw shaft 32 that is threadably mounted on the ball nut 33 via the ball 34 is formed on the intermediate portion 63 of the steered shaft 6. The central axes C1 and C2 of the first and second end portions 61 and 62 of the steered shaft 6 supported by the first and second bushings 71 and 72 are offset by a predetermined offset e from the central axis C3 of the intermediate portion 63.

Therefore, even without forming the outer peripheries of the end portions 61 and 62 of the steered shaft 6 and the inner peripheries of the bushings 71 and 72 to have odd-shaped sections, for example, D-shaped sections, etc., the steered shaft 6 can be reliably restricted from rotating by using the bushings 71 and 72, etc., having simple shapes whose sections are circular. Therefore, the steered shaft 6 can be reliably restricted from rotating inexpensively.

The direction of offset of the central axis C1 from the central axis C3 and the direction of offset of the central axis C2 from the central axis C3 may be different from each other, for example, opposite to each other (not shown).

Figure 5:
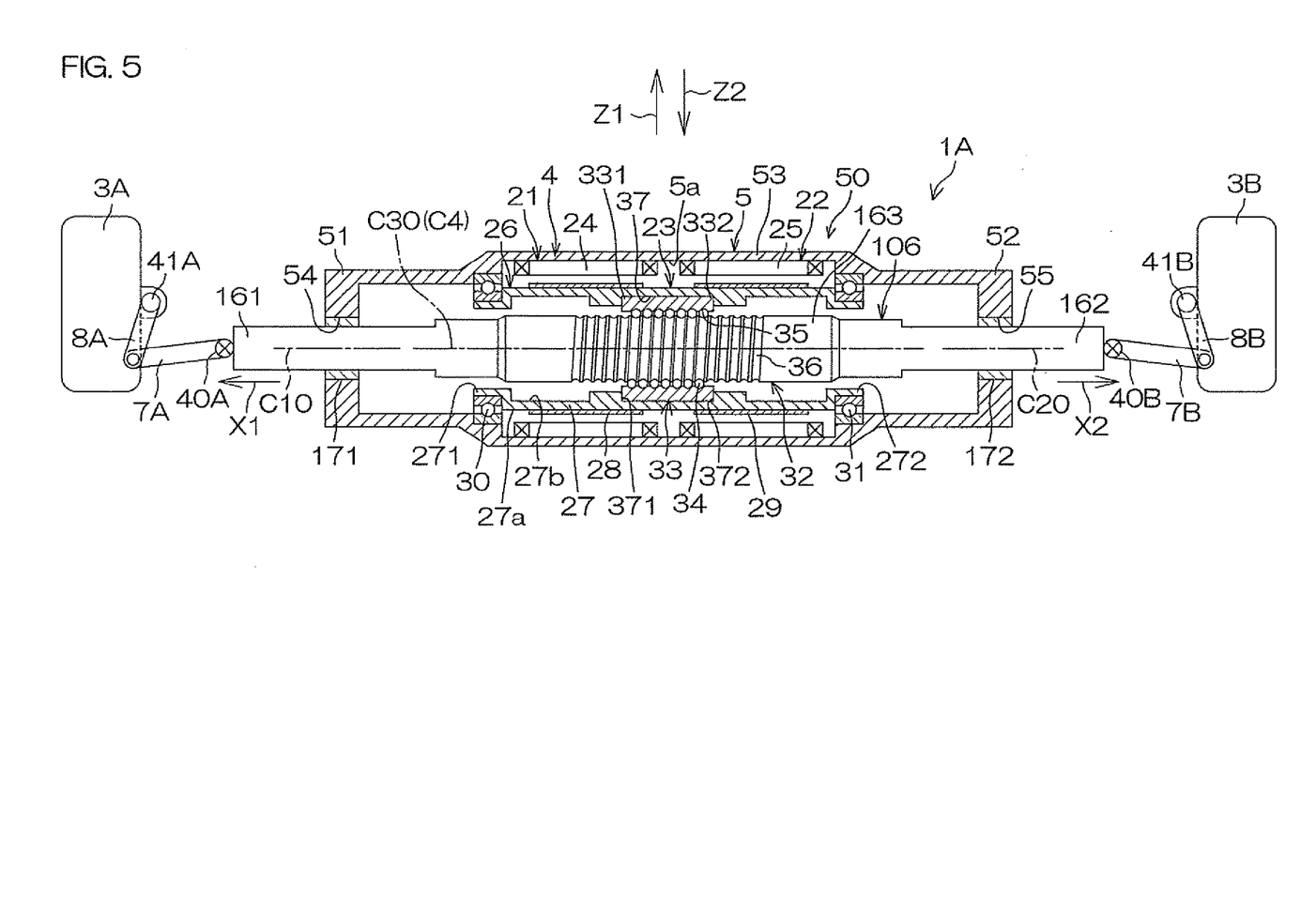
FIG. 5 is a general cross-sectional view of an essential portion of a motor vehicle steering system according to another preferred embodiment of the present invention.
Figure 6:
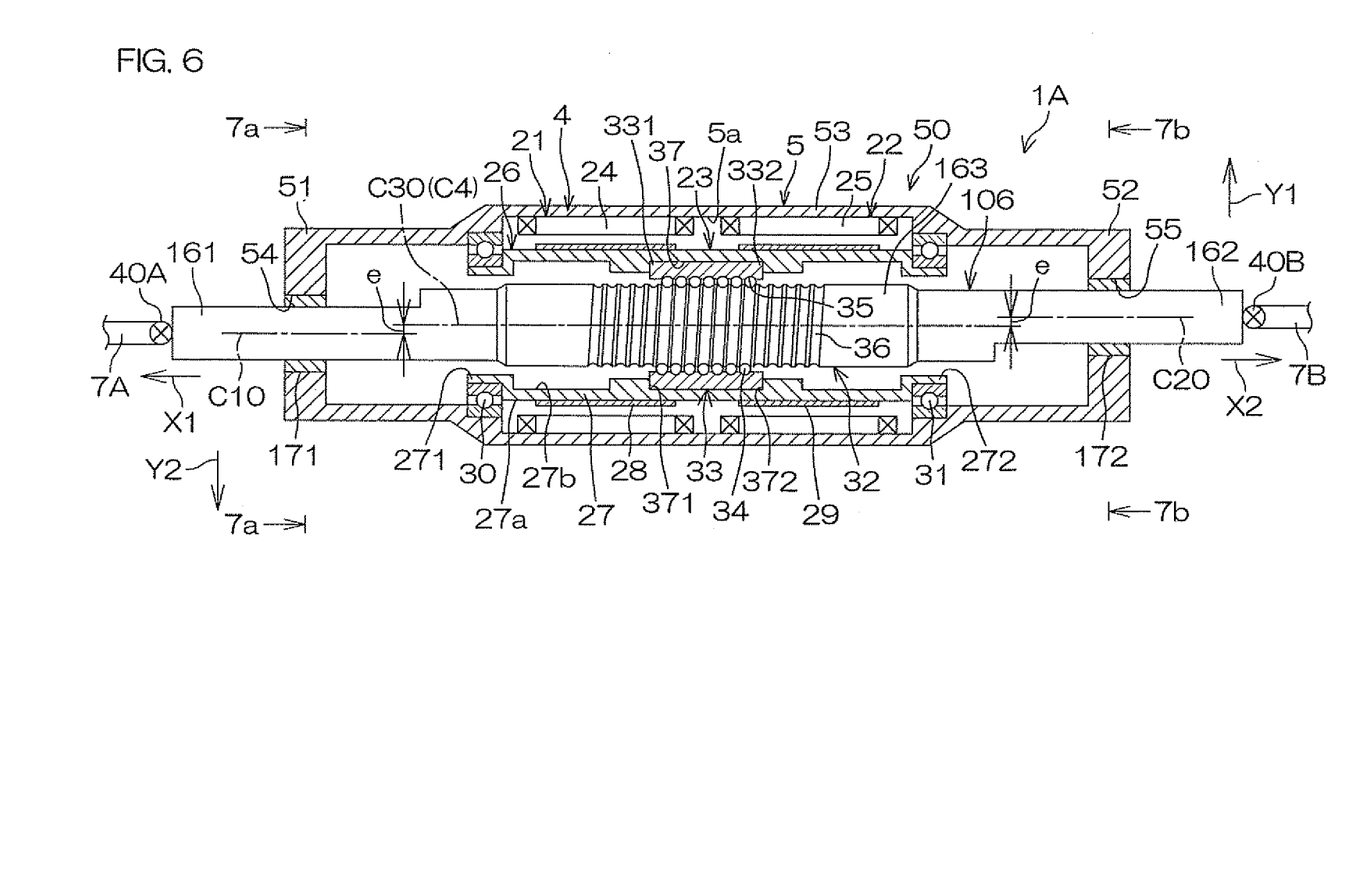
FIG. 6 is a general longitudinal sectional view of the essential portion of the motor vehicle steering system of FIG. 5.
Figure 7:
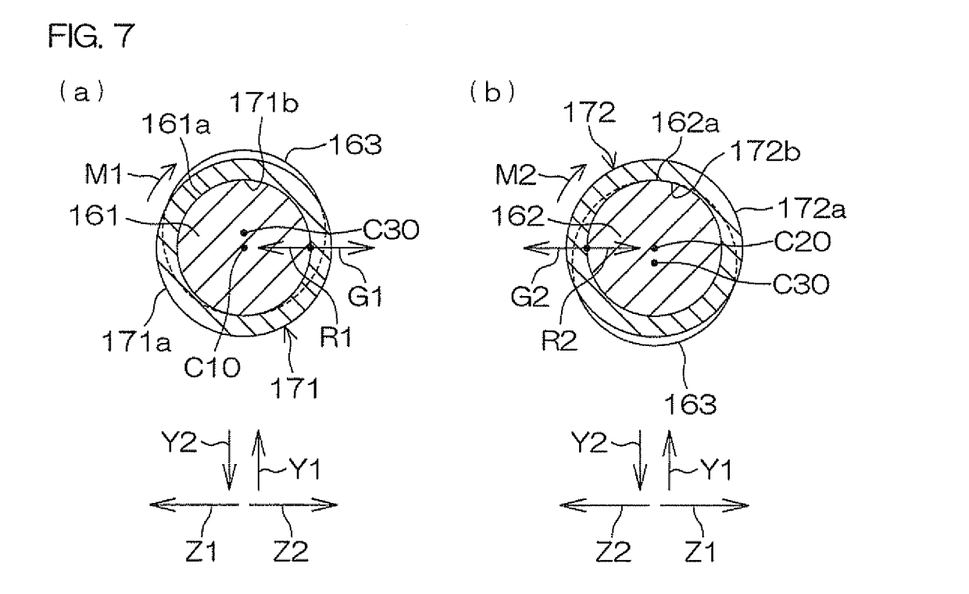
FIG. 7(a) is a sectional view taken along line 7a-7a in FIG. 6, viewed from the left side.
FIG. 7(b) is a sectional view taken along line 7b-7b in FIG. 6, viewed from the right side.
Figure 8:
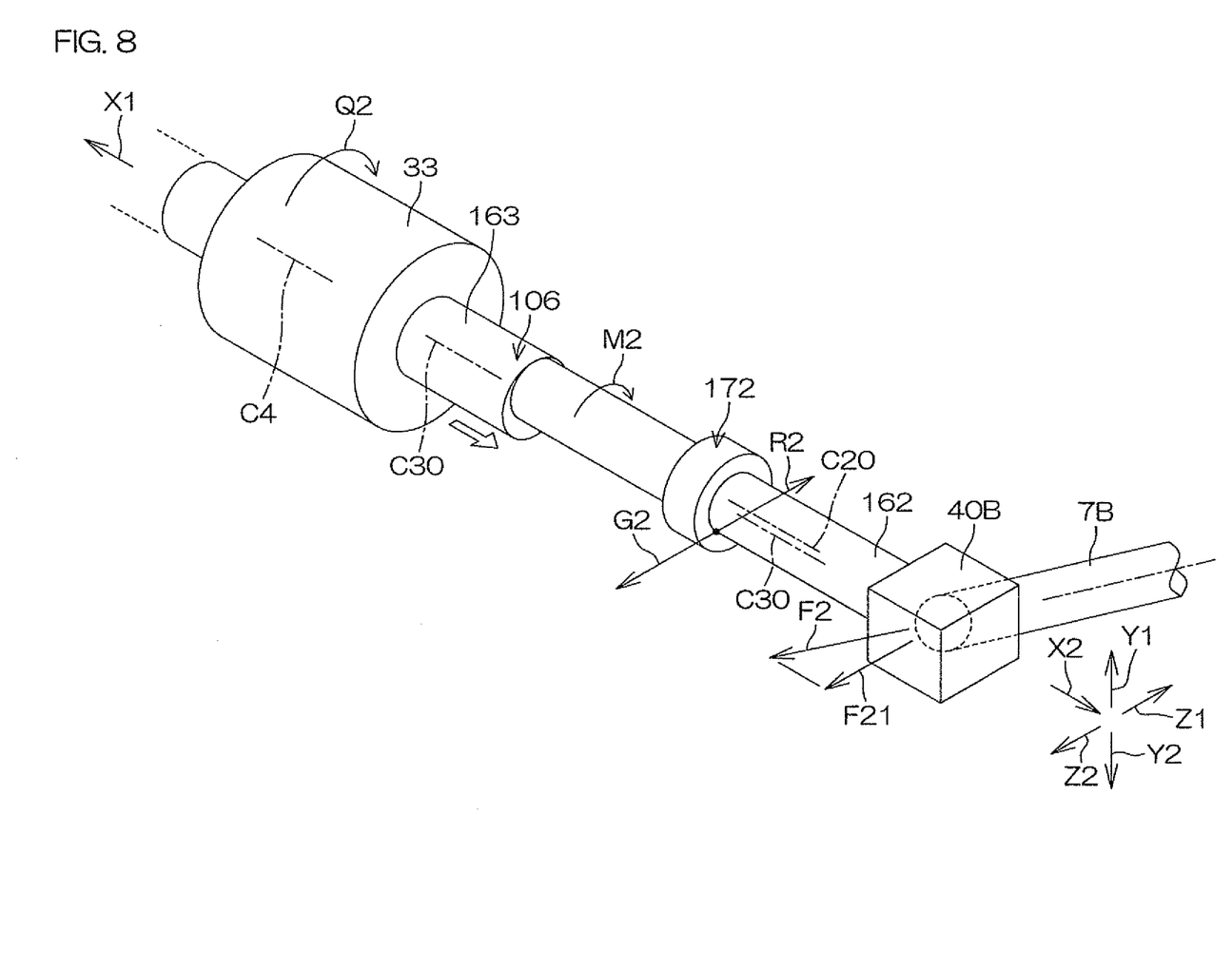
FIG. 8 is a schematic perspective view of a turning mechanism for describing a force to be applied to the steered shaft when the steered shaft moves rightward.

Next, FIG. 5 to FIG. 8 show another preferred embodiment of the present invention. FIG. 5 is a general cross-sectional view of the motor vehicle steering system 1A, and FIG. 6 is a general longitudinal sectional view of the motor vehicle steering system 1A. FIG. 7(a) is a sectional view taken along line 7a-7a in FIG. 6, viewed from the left side. FIG. 7(b) is a sectional view taken along 7b-7b in FIG. 6, viewed from the right side. FIG. 8 is a schematic perspective view of a turning mechanism.

As shown in FIG. 5 that is a cross-sectional view, the positions in the front-rear direction (the forward direction Z1 and the rearward direction Z2) of the central axis C10 of the first end portion 161 of the steered shaft 106, the central axis C20 of the second end portion 162 of the steered shaft 106, and the central axis C30 of the intermediate portion 163 of the steered shaft 106 match each other.

One ends of the knuckle arms 8A and 8B are fixed to corresponding king pins 41A and 41B extending longitudinally. The other ends of the knuckle arms 8A and 8B are connected to corresponding tie rods 7A and 7B via corresponding ball joints 40A and 40B. The steered wheels 3A and 35 are supported so as to be steered around the corresponding king pins 41A and 41B as pivots.

On the other hand, as shown in FIG. 6 that is a longitudinal sectional view, the central axis C10 of the first end portion 161 and the central axis C20 of the second end portion 162 are offset by offset amounts e equal to each other in directions opposite to each other in the up-down direction from the central axis C30 of the intermediate portion 163. In detail, the central axis C10 of the first end portion 161 is offset in the downward direction Y2, and the central axis C20 of the second end portion 162 is offset in the upward direction Y1.

The first bushing 171 is concentric with the first end portion 161 of the steered shaft 106, and the second bushing 172 is concentric with the second end portion 162 of the steered shaft 106. The central axis C30 of the intermediate portion 163 of the steered shaft 106 matches the central axis C4 of the ball nut 33.

In the present preferred embodiment, the screw shaft 32 is a right-hand thread as usual. Therefore, the second end portion 162 (the right end portion) of the steered shaft 106 that becomes a protruding end when the ball nut 33 rotates in the clockwise direction as viewed from the right side is offset in the upward direction Y1 from the central axis C30 of the intermediate portion 163 of the steered shaft 106 as shown in FIG. 7(b). FIG. 7(b) is a view viewed along the first axial direction X1 from the right side.

In addition, the first end portion 161 (the left end portion) of the steered shaft 106 that becomes the retracting end when the ball nut 33 rotates in the clockwise direction as viewed from the right side is offset in the downward direction Y2 from the central axis C30 of the intermediate portion 163 of the steered shaft 106 as shown in FIG. 7(a). FIG. 7(a) is a view viewed along the second axial direction X2 from the left side.

The outer periphery 171a and the inner periphery 171b of the first bushing 171 are circular, and the outer periphery 172a and the inner periphery 172b of the second bushing 172 are circular. The outer periphery 161a of the first end portion 161 of the steered shaft 106 is along the inner periphery 171b of the first bushing 171, and the outer periphery 162a of the second end portion 162 of the steered shaft 106 is along the inner periphery 172b of the second bushing 172.

As shown in FIG. 8, when the ball nut 33 rotates in the clockwise direction Q2 as viewed from the right side, the second end portion 162 of the steered shaft 106 that becomes the protruding end protrudes in the second axial direction X2 (rightward direction). At this time, the second end portion 162 is subjected to an axial force F2 along the axial direction of the tie rod 7B from the tie rod 7B via the ball joint 40B, and this axial force F2 has a radial load F21 in the rearward direction Z2 as a component directed to the rearward direction Z2. Specifically, the second end portion 162 is subjected to the radial load F21 in the backward direction Z2.

The ball nut 33 rotates in the clockwise direction Q2 as viewed from the right side, so that the steered shaft 106 (specifically, an orbit plane of the screw groove 36 of the screw shaft 32) is subjected to a moment load M2 clockwise as viewed from the right side from the ball nut 33 via the ball 34.

As shown in FIG. 7(b), the central axis C20 of the second end portion 162 of the steered shaft 106 is disposed in the upward direction Y1 of the central axis C30 (matching the central axis C4 of the ball nut 33) of the intermediate portion 163 of the steered shaft 106, so that, as shown in FIG. 7(b) and FIG. 8, due to the moment load M2, the second end portion 162 of the steered shaft 106 generates a force G2 to press the second bushing 172 in the rearward direction Z2. The second bushing 172 subjected to this force G2 generates a reaction force R2 with respect to the force G2. Specifically, the second end portion 162 of the steered shaft 106 is subjected to the reaction force R2 (opposite load) in the forward direction Z1 from the second bushing 172.

Accordingly, at least a part of the radial load F21 in the rearward direction Z2 is canceled out by the reaction force R2 (opposite load) in the forward direction Z1 from the second bushing 172. As a result, the radial load of the steered shaft 106 is reduced. Therefore, the ball screw mechanism 23 provided on the steered shaft 106 and the electric motors 21 and 22 that drive the ball screw mechanism 23 can be prevented from being subjected to a high radial load, so that durability can be improved.

Figure 9:
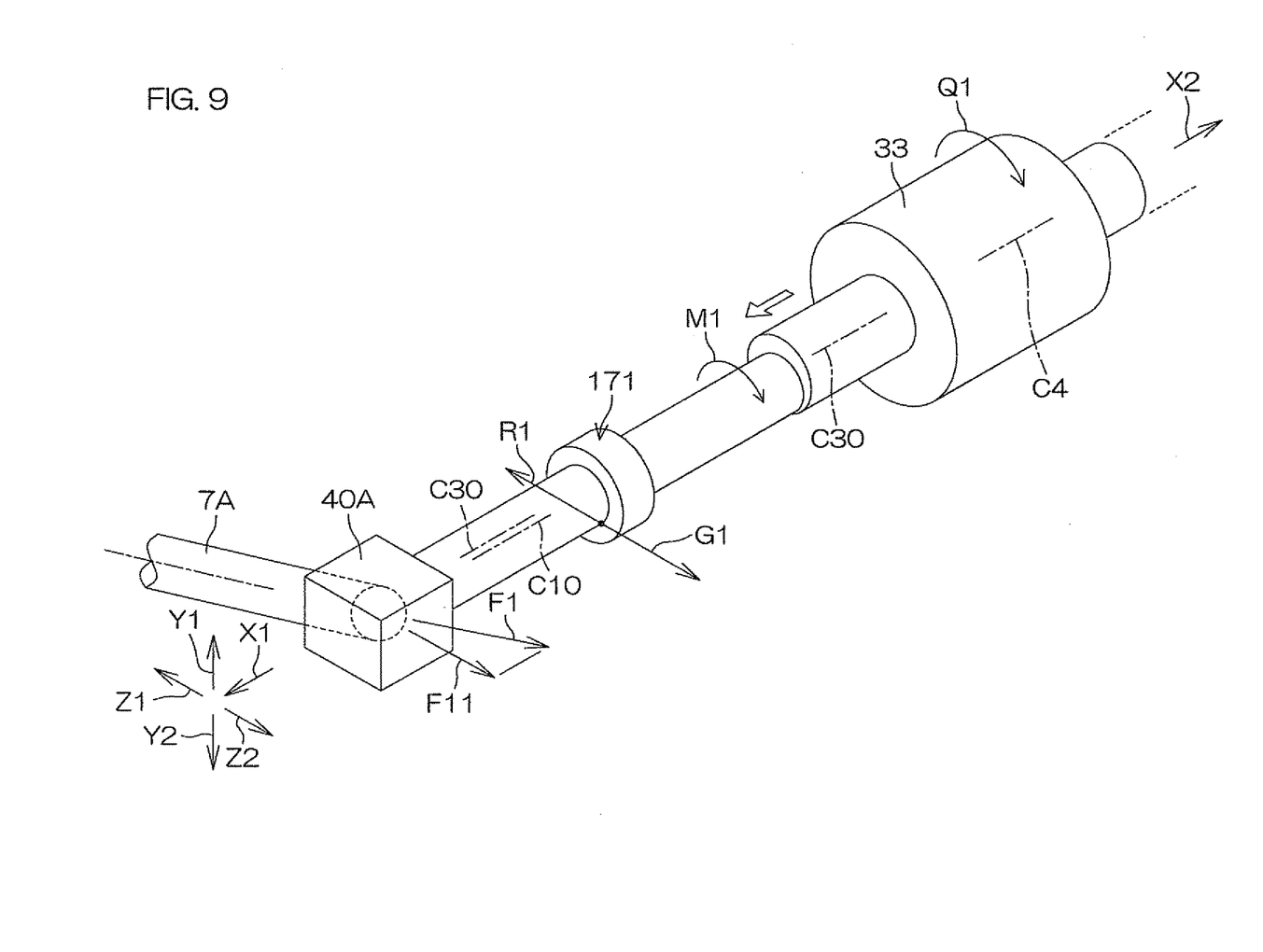
FIG. 9 is a schematic perspective view of a turning mechanism for describing a force to be applied to the steered shaft when the steered shaft moves leftward.

On the other hand, as shown in FIG. 9, when the ball nut 33 rotates in the clockwise direction as viewed from the left side (equivalent to the counterclockwise direction Q1 as viewed from the right side), the first end portion 161 of the steered shaft 106 that becomes the protruding end protrudes in the first axial direction X1 (leftward direction). At this time, the first end portion 161 is subjected to an axial force F1 along the axial direction of the tie rod 7A from the tie rod 7A via the ball joint 40A, and this axial force F1 includes a radial load F11 in the rearward direction Z2 as a component directed to the rearward direction Z2. Specifically, the first end portion 161 is subjected to the radial load F11 in the rearward direction Z2.

The ball nut 33 rotates in the clockwise direction as viewed from the left side (equivalent to the counterclockwise direction Q1 as viewed from the right side), so that the steered shaft 106 (specifically, an orbit plane of the screw groove 36 of the screw shaft 32) is subjected to the moment load M1 in the clockwise direction as viewed from the left side (the counterclockwise direction as viewed from the right side) from the ball nut 33 via the ball 34.

As shown in FIG. 7(a), the central axis C10 of the first end portion 161 of the steered shaft 106 is disposed below the central axis C30 (matching the central axis C4 of the ball nut 33) of the intermediate portion 163 of the steered shaft 106, so that, as shown in FIG. 7(a) and FIG. 9, due to the moment load M1, the first end portion 161 of the steered shaft 106 generates a force G1 to push the first bushing 171 in the rearward direction Z2. The first bushing 171 subjected to this force G1 generates a reaction force R1 with respect to the force G1. Specifically, the first end portion 161 of the steered shaft 106 is subjected to the reaction force R1 (opposite load) in the forward direction Z1 from the first bushing 171.

Accordingly, at least a part of the radial load F11 in the rearward direction Z2 is canceled out by the reaction force R1 (opposite load) in the forward direction Z1 from the first bushing 171. As a result, the radial load of the steered shaft 106 is reduced. Therefore, the ball screw mechanism 23 provided on the steered shaft 106 and the electric motors 21 and 22 that drive the ball screw mechanism 23 can be prevented from being subjected to a high radial load, so that durability can be improved.

In the present preferred embodiment, the description is given by assuming the screw shaft 32 is a right-hand thread, however, the screw shaft 32 may be a left-hand thread. In this case, the first end portion 161 of the steered shaft 106 that becomes the protruding end when the ball nut 33 rotates in the clockwise direction Q2 as viewed from the right side is offset in the upward direction Y1, and the second end portion 162 of the steered shaft 106 that becomes the retracting side is offset in the downward direction Y2 although this is not shown.

In the preferred embodiments described above, the present invention is applied to a steer-by-wire motor vehicle steering system, however, without limiting to this, the present invention is also applicable to a rack-and-pinion motor vehicle steering system.

The present invention is described in detail above based on detailed preferred embodiments, and those skilled in the art who understand the above-described contents may readily conceive modifications, alterations, and equivalents thereto. Therefore, the scope of the present invention should cover the claims and equivalents thereto.

The application of the present invention corresponds to Japanese Patent Application No. 2010-236866 filed in Japan Patent Office on Oct. 21, 2010, and Japanese Patent Application No. 2011-200739 filed in Japan Patent Office on Sep. 14, 2011, whole disclosures of which are incorporated herein by reference.

[Description of Symbols]

1; 1A: Motor vehicle steering system, 2: Steering member, 3: Steered wheel, 4: Turning actuator, 5: Housing, 5a: Inner peripheral surface (of housing), 6; 106: Steered shaft, 7: Tie rod, 8: Knuckle arm, 21: First electric motor, 22: Second electric motor, 23: Ball screw mechanism, 32: Screw shaft, 33: Ball nut, 34: Ball, 50: Turning mechanism, 51: First end portion (of housing), 52: Second end portion (of housing), 54, 55: Bearing holding hole, 61; 161: First end portion (of steered shaft), 61a; 161a: Outer periphery (of first end portion), 62; 162: Second end portion (of steered shaft), 62a; 162a: Outer periphery (of second end portion), 63; 163: Intermediate portion (of steered shaft), 71; 171: First bushing, 71b; 171b: Inner periphery (of first bushing), 72; 172: Second bushing, 72b; 172b: Inner periphery (of second bushing), X1: First axial direction (leftward direction), X2: Second axial direction (rightward direction), Y1: Upward direction, Y2: Downward direction, Z1: Forward direction, Z2: Rearward direction, C1; C10: Central axis (of first end portion of steered shaft), C2; C20: Central axis (of second end portion of steered shaft), C3; C30: Central axis (of intermediate portion of steered shaft), C4: Central axis (of ball nut), 2: Offset, F11; F21: Radial load, M1, M2: Moment load, Q1: Counterclockwise direction (as viewed from the right side), Q2: Clockwise direction (as viewed from the right side), R1, R1: Reaction force

What is claimed is:

1. A motor vehicle steering system comprising:
a tubular housing;
a steered shaft that has a first end portion, a second end portion, and an intermediate portion between the first end portion and the second end portion, the steered shaft being disposed within the tubular housing;
a screw shaft provided on the intermediate portion of the steered shaft;
a ball nut threadably engaged with the screw shaft via balls;
an electric motor configured to drive and to rotate the ball nut;
a first bushing that is held by the housing and that supports the first end portion of the steered shaft such that the first end portion of the steered shaft is slideable in an axial direction of the steered shaft; and
a second bushing that is held by the housing and that supports the second end portion of the steered shaft such that the second end portion of the steered shaft is slideable in the axial direction of the steered shaft, wherein
a central axis of the intermediate portion of the steered shaft is offset from a central axis of the first end portion of the steered shaft and a central axis of the second end portion of the steered shaft such that the central axis of the first end portion and the central axis of the second end portion are offset opposite to each other in an up-down direction from the central axis of the intermediate portion, and
a central axis of the ball nut and the central axis of the intermediate portion of the steered shaft match each other.

2. The motor vehicle steering system according to claim 1, wherein
the steered shaft is not mechanically joined to a steering member.

3. The motor vehicle steering system according to claim 1, wherein
outer peripheries of the first end portion of the steered shaft and the second end portion of the steered shaft and inner peripheries of the first bushing and the second bushing are circular.

4. The motor vehicle steering system according to claim 1, wherein
when the ball nut rotates in the clockwise direction as viewed from the right side one of the first end portion of the steered shaft and the second end portion of the steered shaft that becomes a protruding end is offset in the upward direction from the central axis of the intermediate portion of the steered shaft, and the other of the first end portion of the steered shaft and the second end portion of the steered shaft that becomes a retracting end is offset from the central axis of the intermediate portion of the steered shaft in the downward direction.

5. The motor vehicle steering system according to claim 4, wherein
the motor vehicle steering system is arranged so that, when the one of the first end portion of the steered shaft and the second end portion of the steered shaft that becomes the protruding end when the ball nut rotates in the clockwise direction as viewed from the right side protrudes in the axial direction, the one end portion is subjected to a radial load in a backward direction from a corresponding tie rod, and is subjected to a reaction force against the radial load from one of the first bushing and the second bushing.

6. The motor vehicle steering system according to claim 4, wherein when the one of the first end portion of the steered shaft and the second end portion of the steered shaft that becomes the protruding end when the ball nut rotates in a counterclockwise direction as viewed from the right side and protrudes in the axial direction, the one end portion is subjected to a radial load in a rearward direction from a corresponding tie rod, and is subjected to a reaction force against the radial load from the one of the first bushing and the second bushing.

7. A motor vehicle steering system comprising:
a tubular housing;
a steered shaft that has a first end portion, a second end portion, and an intermediate portion between the first end portion and the second end portion, the steered shaft being disposed within the tubular housing such that the intermediate portion is supported by a bearing;
a screw shaft provided on the intermediate portion of the steered shaft;
a ball nut threadably engaged with the screw shaft via balls, the ball nut being supported by the tubular housing;
an electric motor configured to drive and to rotate the ball nut, the electric motor including a rotor fitted to the ball nut such that the rotor is configured to rotate integrally with the ball nut and that the tubular housing rotatably supports the rotor via the bearing;
a first bushing that is held by the housing and that supports the first end portion of the steered shaft such that the first end portion of the steered shaft is slideable in an axial direction of the steered shaft; and
a second bushing that is held by the housing and that supports the second end portion of the steered shaft such that the second end portion of the steered shaft is slideable in the axial direction of the steered shaft, wherein
a central axis of the intermediate portion of the steered shaft is offset from a central axis of the first end portion of the steered shaft and a central axis of the second end portion of the steered shaft, and
a central axis of the ball nut and the central axis of the intermediate portion of the steered shaft match each other.

* * * * *